(12) United States Patent
Yu et al.

(10) Patent No.: US 10,996,503 B2
(45) Date of Patent: May 4, 2021

(54) DISPLAY DEVICE AND METHOD OF MANUFACTURING SAME

(71) Applicant: Wuhan China Star Optoelectronics Technology Co., Ltd., Hubei (CN)

(72) Inventors: Pengfei Yu, Hubei (CN); Chong Long, Hubei (CN); Tao Song, Hubei (CN); Wei Tang, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 16/623,388

(22) PCT Filed: Nov. 4, 2019

(86) PCT No.: PCT/CN2019/115380
§ 371 (c)(1),
(2) Date: Dec. 16, 2019

(65) Prior Publication Data
US 2021/0088834 A1 Mar. 25, 2021

(30) Foreign Application Priority Data

Sep. 24, 2019 (CN) .......................... 201910902488.X (51) Int. Cl.
*G02F 1/1335* (2006.01)
*G02F 1/1368* (2006.01)
*G09G 3/36* (2006.01)

(52) U.S. Cl.
CPC ...... *G02F 1/133512* (2013.01); *G02F 1/1368* (2013.01); *G02F 1/133514* (2013.01); *G02F 1/133528* (2013.01); *G02F 2202/28* (2013.01); *G09G 3/36* (2013.01)

(58) Field of Classification Search
CPC .................... G02F 1/133512; G02F 1/133528
USPC .......................................................... 349/42
See application file for complete search history.

(56) References Cited

U.S. PATENT DOCUMENTS

2012/0206669 A1* 8/2012 Kim ...................... G02F 1/1339
349/58
2012/0265350 A1* 10/2012 Ashdown ............. H05B 47/115
700/276
2013/0258234 A1* 10/2013 Park .................. G02F 1/133512
349/58

(Continued)

FOREIGN PATENT DOCUMENTS

CN 108594524 A 9/2018
CN 108681131 A 10/2018

(Continued)

*Primary Examiner* — Christopher M Raabe
(74) *Attorney, Agent, or Firm* — Hamre, Schumann, Mueller & Larson, P.C.

(57) ABSTRACT

A display device and a method of manufacturing the same are provided. The display device includes a liquid crystal cell, a first polarizer, a second polarizer, a backlight module, a first light shielding body and a second light shielding body. The liquid crystal cell includes a light transmissive area. The first polarizer is provided with a first opening. The second polarizer is provided with a second opening. The first light shielding body is disposed in the first opening. The second light shielding body is disposed in the second opening.

16 Claims, 2 Drawing Sheets (56) References Cited

U.S. PATENT DOCUMENTS

| | | | |
|---|---|---|---|
| 2015/0161137 A1* | 6/2015 | Lashina | H05B 47/155 707/749 |
| 2015/0204497 A1* | 7/2015 | Grajcar | A01K 29/00 362/2 |
| 2016/0011633 A1* | 1/2016 | Watanabe | G06F 1/1637 345/184 |
| 2017/0059771 A1* | 3/2017 | Yuki | G02B 6/0088 |
| 2017/0192406 A1* | 7/2017 | Ashdown | H05B 47/11 |
| 2019/0243417 A1* | 8/2019 | Cheng | H04M 1/0264 |
| 2019/0331960 A1 | 10/2019 | Li et al. | |
| 2020/0064681 A1* | 2/2020 | Son | G06F 1/1626 |
| 2020/0174319 A1* | 6/2020 | Chang | H04M 1/0266 |
| 2020/0186688 A1* | 6/2020 | Chen | G02F 1/133528 |
| 2020/0192142 A1* | 6/2020 | Kim | G02F 1/133308 |
| 2020/0341306 A1* | 10/2020 | Shi | G02F 1/1339 |

FOREIGN PATENT DOCUMENTS

| | | |
|---|---|---|
| CN | 109597236 A | 4/2019 |
| CN | 110244484 A | 9/2019 |

\* cited by examiner

Providing a liquid crystal cell comprising a light transmissive area, a first surface, and a second surface, wherein a first polarizer disposed on the first surface, a second polarizer disposed on the second surface, the first polarizer is provided with a first opening, the second polarizer is provided with a second opening, an orthographic projection of the light transmissive area on the first surface is located within an orthographic projection of a wall of the first opening on the first surface, and an orthographic projection of the light transmissive area on the second surface is located within an orthographic projection of a wall of the second opening on the second surface — S101

Forming a first light shielding body in the first opening, the first light shielding body extending from the wall of the first opening to a boundary of the light transmissive area — S102

Providing a backlight module, wherein the backlight module is assembled with the liquid crystal cell, the backlight module comprises a first through hole, and the first through hole corresponds to the light transmissive area — S103

Forming a second light shielding body in the second opening, the second light shielding body extending from the wall of the second opening to a wall of the first through hole — S104

FIG. 3

DISPLAY DEVICE AND METHOD OF MANUFACTURING SAME

FIELD OF INVENTION

The present disclosure relates to the field of display panel technologies, and more particularly to a display device and a method of manufacturing the same.

BACKGROUND OF INVENTION

With the development of display technologies, people have a higher pursuit of full screens, and the full screen technologies with higher screen ratio, larger effective display area, and more stunning display effects have gradually become a mainstream. Following notch screens and water drop screens, hole-cutting screens are introduced on the market, that is, full-screen display effect is realized by an opening of the display panel. While preserving a complete visual effect of a fuselage, the hole-cutting screen can better position a front camera lens and other photosensitive components.

In in-plane blind hole designs of current display panels, when a backlight board and a glass substrate are assembled, a light-shielding glue is coated on an opening of a polarizer. However, due to poor coating precision of the glue, the glue will overflow at an edge of the opening, which affects appearance of the glue, thereby narrowing a viewing angle range of a camera.

SUMMARY OF INVENTION

The present application provides a display device and a method of manufacturing the same to solve issues that a light shielding glue overflows during coating.

The present application provides a display device, comprising:

A liquid crystal cell comprising a light transmissive area for passing light required for an electronic device, wherein the liquid crystal cell comprises a first surface and a second surface, the first surface is oriented a side of a user, and the second surface is located on a side facing a backlight module;

A first polarizer disposed on the first surface; wherein the first polarizer is provided with a first opening, and an orthographic projection of the light transmissive area on the first surface is located within an orthographic projection of a wall of the first opening on the first surface;

A second polarizer disposed on the second surface; wherein the second polarizer is provided with a second opening, and an orthographic projection of the light transmissive area on the second surface is located within an orthographic projection of a wall of the second opening on the second surface;

The backlight module disposed on a side of the second polarizer; wherein the backlight module is bonded to the liquid crystal cell through a glue, the backlight module comprises a first through hole, and the first through hole corresponds to the light transmissive area;

A first light shielding body disposed in the first opening, wherein an orthographic projection of the first light shielding body on the first surface is located at an outer circumference of an orthographic projection of the light transmissive area on the first surface, and the first light shielding body is a light shielding glue or a black ink; and A second light shielding body disposed in the second opening and extending to a wall of the first through hole, wherein an orthographic projection of the second light shielding body on the second surface is located at an outer circumference of an orthographic projection of the light transmissive area on the second surface, and the second light shielding body is a light shielding glue.

In the display device of the present application, the liquid crystal cell further comprises a color filter substrate and an array substrate disposed opposite to each other and a liquid crystal disposed between the filter film substrate and the array substrate;

The color filter substrate comprises a first substrate and a color filter functional layer disposed on the first substrate, the color filter functional layer is provided with a second through hole corresponding to the light transmissive area, and the second through hole exposes the first substrate;

The array substrate comprises a second substrate and a thin film transistor functional layer disposed on the second substrate, the thin film transistor functional layer is provided with a third through hole corresponding to the light transmissive area, and the third through hole exposes the second substrate;

The liquid crystal is filled in the second through hole and the third through hole; and The light transmissive area comprises an exposed portion of the first substrate, an exposed portion of the second substrate, and the liquid crystal between the exposed portion of the first substrate and the exposed portion of the second substrate.

In the display device of the present application, the first light shielding body is attached to the wall of the first opening, and the second light shielding body is attached to the wall of the second opening;

An orthographic projection of the second light shielding body on the second surface is located within an orthographic projection of the first light shielding body on the second surface.

In the display device of the present application, the second light shielding body has a predetermined distance from a boundary of the light transmissive area.

In the display device of the present application, an orthographic projection of the wall of the second opening on the first surface is located within an orthographic projection of the wall of the first opening on the first surface.

In the display device of the present application, the first through hole is disposed coaxially with the light transmissive area.

The present application further provides a display device, comprising:

A liquid crystal cell comprising a light transmissive area for passing light required for an electronic device, wherein the liquid crystal cell comprises a first surface and a second surface, the first surface is oriented a side of a user, and the second surface is located on a side facing a backlight module;

A first polarizer disposed on the first surface; wherein the first polarizer is provided with a first opening, and an orthographic projection of the light transmissive area on the first surface is located within an orthographic projection of a wall of the first opening on the first surface;

A second polarizer disposed on the second surface; wherein the second polarizer is provided with a second opening, and an orthographic projection of the light transmissive area on the second surface is located within an orthographic projection of a wall of the second opening on the second surface;

The backlight module disposed on a side of the second polarizer; wherein the backlight module comprises a first through hole, and the first through hole corresponds to the light transmissive area;

A first light shielding body disposed in the first opening, wherein an orthographic projection of the first light shielding body on the first surface is located at an outer circumference of an orthographic projection of the light transmissive area on the first surface; and A second light shielding body disposed in the second opening and extending to a wall of the first through hole, wherein an orthographic projection of the second light shielding body on the second surface is located at an outer circumference of an orthographic projection of the light transmissive area on the second surface.

In the display device of the present application, the liquid crystal cell further comprises a color filter substrate and an array substrate disposed opposite to each other and liquid crystal disposed between the filter film substrate and the array substrate;

The color filter substrate comprises a first substrate and a color filter functional layer disposed on the first substrate, the color filter functional layer is provided with a second through hole corresponding to the light transmissive area, and the second through hole exposes the first substrate;

The array substrate comprises a second substrate and a thin film transistor functional layer disposed on the second substrate, the thin film transistor functional layer is provided with a third through hole corresponding to the light transmissive area, and the third through hole exposes the second substrate;

The liquid crystal is filled in the second through hole and the third through hole; and The light transmissive area comprises an exposed portion of the first substrate, an exposed portion of the second substrate, and liquid crystal between the exposed portion of the first substrate and the exposed portion of the second substrate.

In the display device of the present application, the first light shielding body is attached to the wall of the first opening, and the second light shielding body is attached to the wall of the second opening;

An orthographic projection of the second light shielding body on the second surface is located within an orthographic projection of the first light shielding body on the second surface.

In the display device of the present application, the second light shielding body has a predetermined distance from a boundary of the light transmissive area.

In the display device of the present application, the backlight module is bonded to the liquid crystal cell through a glue.

In the display device of the present application, an orthographic projection of the wall of the second opening on the first surface is located within an orthographic projection of the wall of the first opening on the first surface.

In the display device of the present application, the first light shielding body is a light shielding glue or a black ink; and The second light shielding body is a light shielding glue.

In the display device of the present application, the first through hole is disposed coaxially with the light transmissive area.

The present further provides a manufacturing method of a display device, comprising:

Providing a liquid crystal cell comprising a light transmissive area, a first surface, and a second surface, wherein a first polarizer disposed on the first surface, a second polarizer disposed on the second surface, the first polarizer is provided with a first opening, the second polarizer is provided with a second opening, an orthographic projection of the light transmissive area on the first surface is located within an orthographic projection of a wall of the first opening on the first surface, and an orthographic projection of the light transmissive area on the second surface is located within an orthographic projection of a wall of the second opening on the second surface;

Forming a first light shielding body in the first opening, the first light shielding body extending from the wall of the first opening to a boundary of the light transmissive area;

Providing a backlight module, wherein the backlight module is assembled with the liquid crystal cell, the backlight module comprises a first through hole, and the first through hole corresponds to the light transmissive area; and Forming a second light shielding body in the second opening, the second light shielding body extending from the wall of the second opening to a wall of the first through hole.

In the display device of the present application, forming the first light shielding body in the first opening comprises:

Coating or spraying a first light shielding material in the first opening, the first light shielding material extending from the wall of the first opening to the boundary of the light transmissive area; and Curing the first light shielding material to form the first light shielding body.

Beneficial effects of the present application are: the present application provides a display device and a method of manufacturing the same, by providing a first light shielding body in a first opening on a side of a color filter substrate, and providing a second light shielding body at a second opening on a side of an array substrate, and the first light shielding body covers a light shielding area where the second light shielding body is located, and avoids issues of overflow of the second light shielding body in a direction of the light transmissive area, thereby ensuring viewing angle range of an electronic device.

DESCRIPTION OF DRAWINGS

In order to more clearly illustrate the technical solutions in the embodiments of the present application, the drawings used in the description of the embodiments will be briefly described below. It is obvious that the drawings in the following description are only some embodiments of the present application. Other drawings can also be obtained from those skilled in the art based on these drawings without paying any creative effort.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

It should be noted that the display device provided by an embodiment of the present application can be applied to an electronic device such as a mobile phone, a tablet computer, or a digital camera. In the drawings of the embodiments of the present application, only the display device is applied to the mobile phone as an example, which is not limited in the present application.

In addition, openings, through holes, and a light transmissive area 10A involved in the embodiments of the present application may be circular, elliptical, or other shapes. In the drawings of the embodiments of the present application, only the openings, the through holes, and the light transmissive area 10A are circular, and the description is not limited herein.

Figure 1:
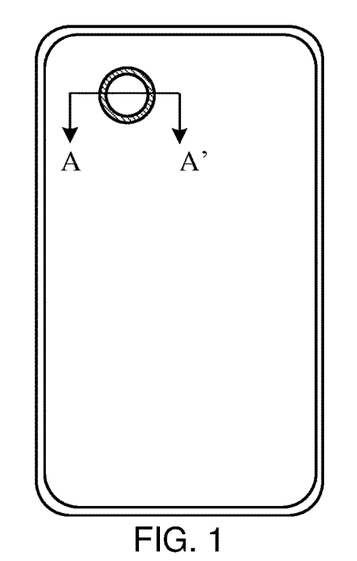
FIG. 1 is a schematic plan view of a display device according to an embodiment of the present application.
Figure 2:
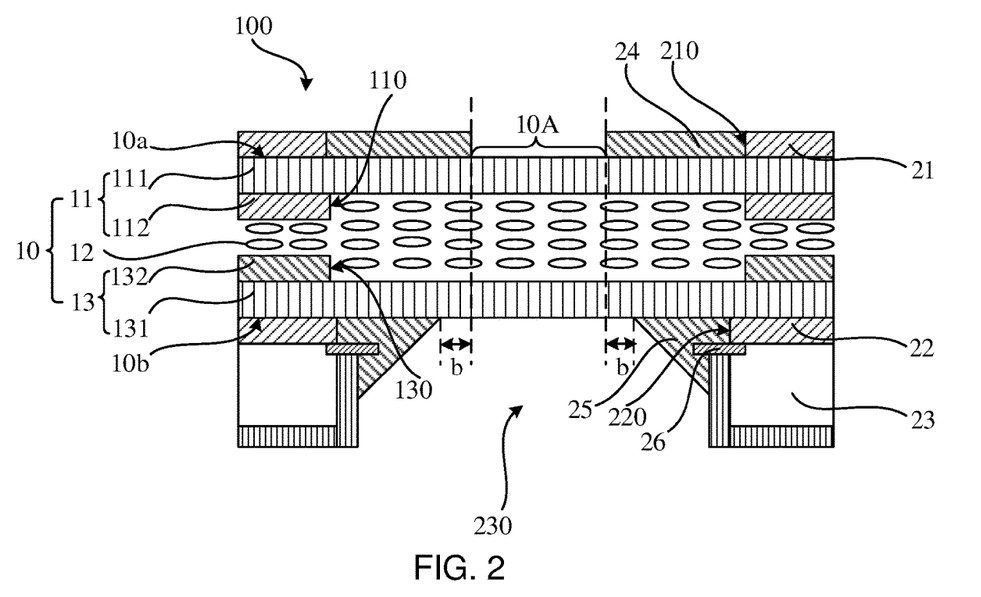
FIG. 2 is a cross-sectional structural view taken along line AA' of FIG. 1 according to an embodiment of the present application.

Referring to FIG. 1 and FIG. 2, FIG. 1 is a schematic plan view of a display device according to an embodiment of the present application. FIG. 2 is a cross-sectional structural view taken along line AA' of FIG. 1 according to an embodiment of the present application. The display device 100 includes a liquid crystal cell 10, a first polarizer 21, a second polarizer 22, a backlight module 23, a first light shielding body 24, and a second light shielding body 25. The liquid crystal cell 10 includes a light transmissive area 10A, a first surface 10a, and a second surface 10b. The first polarizer 21 is disposed on the first surface 10a. The first polarizer 21 is provided with a first opening 210. The second polarizer 22 is disposed on the second surface 10b. The second polarizer 22 is provided with a second opening 220. The backlight module 23 is disposed on a side of the second polarizer 22. The backlight module 23 includes a first through hole 230. The first light shielding body 24 is disposed in the first opening 210. The second light shielding body 25 is disposed in the second opening 220.

Specifically, the liquid crystal cell 10 includes the light transmissive area 10A. The light transmissive area 10A is used for passing light required for an electronic device. The liquid crystal cell 10 includes the first surface 10a and the second surface 10b. The first surface 10a is disposed on a side facing a user. The second surface 10b is disposed on a side facing the backlight module 23. Optionally, the electronic device is a camera module or other light sensing device.

The first polarizer 21 is disposed on the first surface 10a. The first polarizer 21 is provided with the first opening 210. An orthographic projection of the light transmissive area 10A on the first surface 10a is located within an orthographic projection of a wall of the first opening 210 on the first surface 10a. The second polarizer 22 is disposed on the second surface 10b. The second polarizer 22 is provided with the second opening 220. An orthographic projection of the light transmissive area 10A on the second surface 10b is located within an orthographic projection of a wall of the second opening 220 on the second surface 10b. In some embodiments, an upper surface of the first polarizer 21 further includes components (not shown) such as an optical glue, a glass cover, and the like which are sequentially disposed, and details are not described herein.

The backlight module 23 is disposed on a side of the second polarizer 22. The backlight module 23 includes a first through hole 230. The first through hole 230 is disposed corresponding to the light transmissive area 10A. The first through hole 230 can be used to place an electronic device. Specifically, a front camera can be placed in the first through hole 230, and other sensor components such as a distance sensor and a light sensor can be placed. In some embodiments, the backlight module further includes an optical film (not shown) such as a back plate, a light guide plate, a light source, a diffusion plate, and a brightness enhancement film, which are not described herein.

The first light shielding body 24 is disposed in the first opening 210. An orthographic projection of the first light shielding body 24 on the first surface 10a is located at an outer circumference of an orthographic projection of the light transmissive area 10A on the first surface 10a.

In an embodiment of the present application, because the first light shielding body 24 is disposed on the first surface 10a of the liquid crystal cell 10, control of a shape of a coating glue can be realized by controlling a shape of the first light shielding body 24.

The second light shielding body 25 is disposed in the second opening 220 and extends to a wall of the first through hole 230. An orthographic projection of the second light shielding body 25 on the second surface 10b is located at an outer circumference of an orthographic projection of the light transmissive area 10A on the second surface 10b. On the orthographic projection of the second surface 10b, a side of the second light shielding body 25 close to the light transmissive area 10A may be spaced apart from a boundary of the light transmissive area 10A or may coincide with the boundary of the light transmissive area 10A. The second light shielding body 25 can be partially extended to the wall of the first through hole 230, or can be completely covered by the wall of the first through hole 230. The specific application can be set according to the actual application, which is not limited in this application.

When light emitted by a light source passes through the second polarizer 22, a light leakage effect occurs at a contact portion between the wall of the second opening 220 and an edge of the wall of the first through hole 230, and the second light shielding body 25 can block the contact portion. The leaked light prevents light from entering the light transmissive area 10A and affects lighting of the electronic device.

The liquid crystal cell 10 further comprises a color filter substrate 11 and an array substrate 13 disposed opposite to each other and liquid crystal 12 disposed between the filter film substrate 11 and the array substrate 13. The color filter substrate 11 comprises a first substrate 111 and a color filter functional layer 112 disposed on the first substrate 111, the color filter functional layer 112 is provided with a second through hole 110 corresponding to the light transmissive area 10A, and the second through hole 110 exposes the first substrate 111. The array substrate 13 comprises a second substrate 131 and a thin film transistor functional layer 132 disposed on the second substrate 131, the thin film transistor functional layer 132 is provided with a third through hole 130 corresponding to the light transmissive area 10A, and the third through hole 130 exposes the second substrate 131. An orthographic projection of the light transmissive area 10A on the first surface 10a is located within an orthographic projection of a wall of the second through hole 110 on the first surface 10a. An orthographic projection of the light transmissive area 10A on the second surface 10b is located within an orthographic projection of a wall of the third through hole 130 on the second surface 10b. The liquid crystal 12 is filled in the second through hole 110 and the third through hole 130. The light transmissive area 10A comprises an exposed portion of the first substrate 111, an exposed portion of the second substrate 131, and liquid crystal 12 between the exposed portion of the first substrate 111 and the exposed portion of the second substrate 131.

It should be noted that an aperture of the second through hole 110 may be the same as an aperture of the first opening 210 or less than the aperture of the first opening 210. Correspondingly, an aperture of the third through hole 130 may be the same as the aperture of the first opening 210 or less than the aperture of the first opening 210. The specific situation is set according to the actual situation, which is not limited in this application.

In the actual process operation, when the first polarizer 21 is attached to the first substrate 111, attaching accuracy is shifted, and light emitted by a backlight source leaks from offset of the first polarizer 21. By providing the first light shielding body 24 at the opening of the first polarizer 21, a light leakage area caused by offset of attaching accuracy can be blocked.

Optionally, the first substrate 111 and the second substrate 131 are glass substrates. Material of the first substrate 111 and material of the second substrate 131 may be the same or different, and may be selected according to actual conditions in a specific application, which is not limited in the present application.

In an embodiment, the first light shielding body 24 is attached to the wall of the first opening 210. The second light shielding body 25 is attached to the wall of the second opening 220. An orthographic projection of the second light attached body 25 on the second surface 20a is located within an orthographic projection of the first light attached body 24 on the second surface 10b. Due to issues of accuracy of coating glue, a shape of the second light shielding body 25 is not uniform. When the backlight module 23 is assembled with the liquid crystal cell 10, alignment of the first through hole 230 and the light transmissive area 10A is affected. The first light shielding body 24 can cover a light shielding area where the second light shielding body 25 is located, thereby reducing requirement of the shape of the coating glue of the light shielding area where the second light shielding body 25 is located.

In the embodiment, the second light shielding body 25 has a predetermined distance b from a boundary of the light transmissive area 10A. The predetermined distance b is an overflow distance of the second light shielding body 25. That is, in a coating process of the second light shielding body 25, the second light shielding body 25 may be allowed to extend to a range of the predetermined distance b. In addition, the first light shielding body 24 covers an overflow area of the second light shielding body 25, thereby effectively avoiding issues of irregularity of the second light shielding body 25 due to poor glue coating precision. Specifically, a length of the predetermined distance b can be set according to actual application requirements, which is not limited in this application.

The backlight module 23 is bonded to the liquid crystal cell 10 through a glue 26. Optionally, the glue 26 is a light shielding material having a light-shielding effect, and has a light-shielding effect on a light leakage generated by the second polarizer 22 and an edge of the wall of the first through hole 230. In an embodiment of the present application, the glue 26 can also be used to bond an edge of a panel formed by the backlight module 23 and the liquid crystal cell 10 (not shown), and details are not described herein.

An orthographic projection of a wall of the second opening 220 on the first surface 10a is located within an orthographic projection of a wall of the first opening 210 on the first surface 10a, and an aperture of the first opening 210 is greater an aperture of the second opening 220.

Adhesion of the backlight module 23 to the second polarizer 22 may cause the glue that overflows in a direction of the second light shielding body 25 toward the second polarizer 22, which affects a shape of a coating glue of the second light shielding body 25 due to interference of the glue 26. The second light shielding body 25 is adhered to the wall of the second opening 220, and the second light shielding body 25 is adhered to the wall of the second opening 220. Therefore, the first light shielding body 24 correspondingly covers an overflow portion of the second light blocking body 25 to ensure integrity of overall appearance of a light shielding glue.

It should be noted that, in order to ensure that the first light shielding body 24 effectively covers a surface of an overflow glue, in order to not affect a display area of a display region, an aperture of the first opening 210 is slightly greater than an aperture of the second opening 220 in polarizer opening design.

Optionally, the first light shielding body 24 is a light shielding glue or a black ink, or other light shielding material having a light shielding effect. The second light shielding body 25 may be a light shielding glue. The specific application may be selected according to the actual situation, which is not limited in this application.

In an embodiment of the present application, the first through hole 230 is disposed coaxially with the light transmissive area 10A.

In the display device 100 provided by an embodiment of the present application, the first light shielding body 24 is disposed in the first opening 210 on a side of the color filter substrate 11, and the second light shielding body 25 is disposed at the second opening 220 on a side of the array substrate 13. The first light shielding body 24 covers a light shielding area where the second light shielding body 25 is located, thereby avoiding issues of overflow of the second light shielding body 25 in a direction of the light transmissive area 10A, thereby ensuring a viewing angle range of the electronic device. In addition, when the backlight module 23 and the second polarizer 22 are attached, the first light shielding body 24 correspondingly covers an overflow portion of the second light shielding body 25, thereby ensuring integrity of an overall appearance of a light shielding glue.

Figure 3:
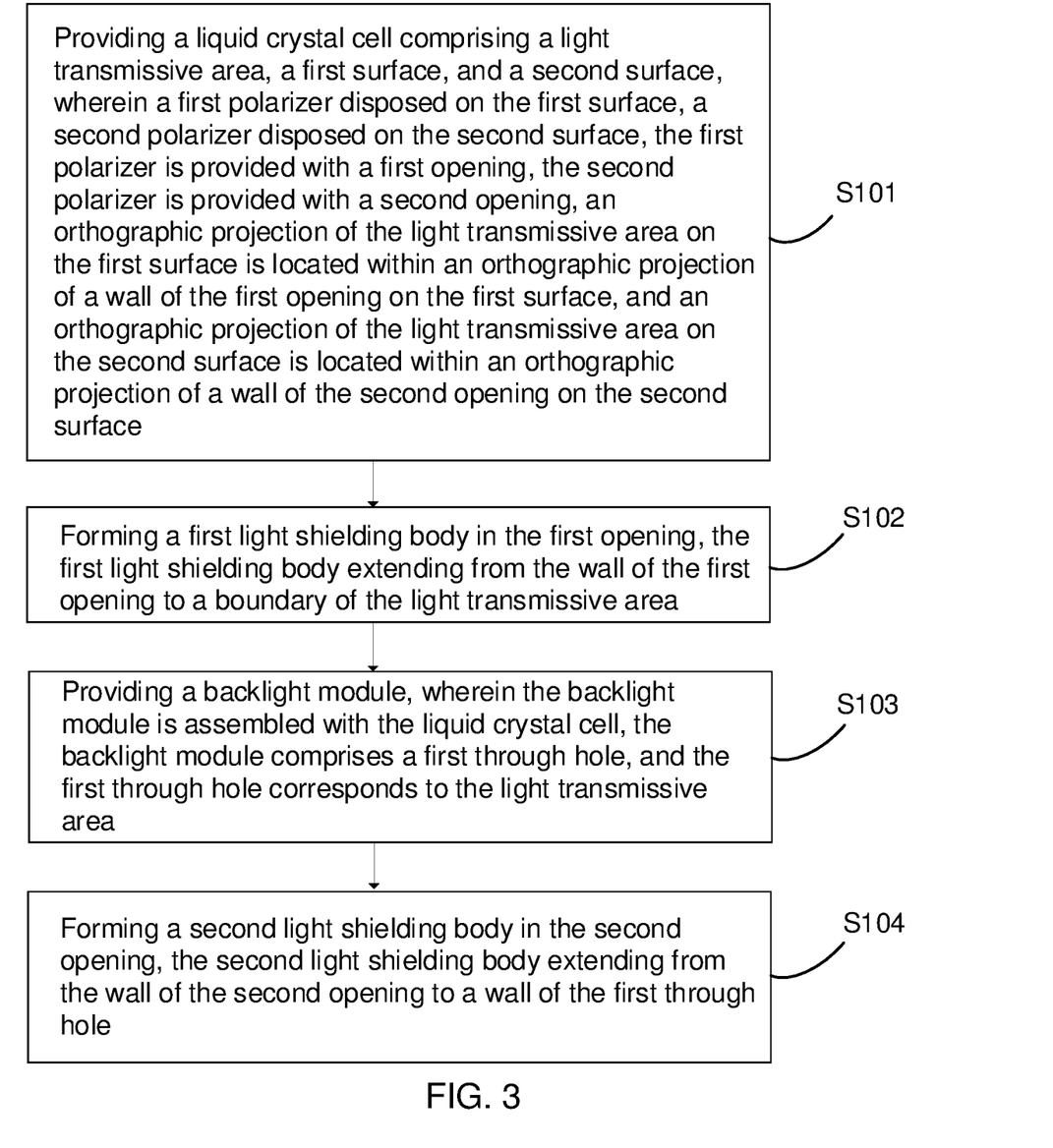
FIG. 3 is a flowchart of a method of manufacturing a display device according to an embodiment of the present application.

Referring to FIG. 2 and FIG. 3, FIG. 3 is a flowchart of a method of manufacturing a display device according to an embodiment of the present application. As shown in FIG. 3, the manufacturing method of the display device provided by the present application includes.

Step S101, providing a liquid crystal cell 10 comprising a light transmissive area 10A, a first surface 10a, and a second surface 10b. A first polarizer 21 disposed on the first surface 10a. A second polarizer 22 disposed on the second surface 10b. The first polarizer 21 is provided with a first opening 210. The second polarizer 22 is provided with a second opening 220. An orthographic projection of the light transmissive area 10A on the first surface 10a is located within an orthographic projection of a wall of the first opening 210 on the first surface 10a. An orthographic projection of the light transmissive area 10A on the second surface 10b is located within an orthographic projection of a wall of the second opening 220 on the second surface 10b.

Specifically, in an assembly process of the liquid crystal cell 10, the following steps are included. A first substrate 111 is provided, a color filter functional layer 112 is formed on the first substrate 111, a second substrate 131 is provided, and a thin film transistor functional layer 132 is formed on the second substrate 131. In a process of the liquid crystal cell 10, circular hole spaces ate reserved in opening areas of the color filter functional layer 112 and the thin film transistor functional layer 132, respectively, and a film layer in the circular hole space is punctured to form a corresponding second through hole 110 and a corresponding third through hole 130 Then, the liquid crystal 12 is filled between the color filter substrate 11 and the array substrate 13, and the liquid crystal cell 10 is formed by an attaching process. The liquid crystal 12 is located between the color filter substrate 11 and the array substrate 13 in the opening area, and fills the second through hole 110 and the third through hole 130.

The first polarizer 21 is attached to the first surface 10a of the liquid crystal cell 10, and the first polarizer 21 is attached with a first protective film. The second polarizer 22 is attached to the second surface 10b, and the second polarizer 22 is attached with a second protective film. In some embodiments, the assembly process of the liquid crystal cell 10 further includes processing of an alignment film, a sealant coating, bonding, cutting, sealing, and the like after assembly, and will not be described herein.

Step S102, forming a first light shielding body 24 in the first opening 210, the first light shielding body 24 extending from the wall of the first opening 210 to a boundary of the light transmissive area 10A.

Material of the first light shielding body 24 is a first light shielding material, and the first light shielding body 24 is formed by coating or spraying the first light shielding material in the first opening 210. In an embodiment of the present application, the first light shielding material may be directly applied to the first opening 210, or the first light shielding material may be sprayed into the first opening 210 by a spraying device, and the specific method may be according to actual process requirements. The selection is made, and the application does not limit this.

Before forming the first light shielding body 24, the liquid crystal cell 10 is first bonded to a base circuit board, a driving circuit board, and the like to complete connection of a driving circuit. Then, the first protective film on the first polarizer 21 is removed, and the first light shielding material is coated or sprayed in the first opening 210. The first light shielding material may be a light shielding glue or a black ink. Because the first light shielding body 24 is formed in the first opening 210 by a planar process, a process operation is simple, and a process cost can be saved while obtaining a good glued shape.

Specifically, the first light shielding material may extend from a wall of the first opening 210 to a boundary of the light transmissive area 10A. The first light shielding body 24 is formed by curing the first light shielding material. The first light shielding body 24 can completely cover the wall of the first opening 210. After the first light shielding body 24 is formed, the method further includes a step of attaching an optical adhesive to a glass cover. A side of the glass cover to which the optical adhesive is attached is bonded to the first polarizer 21. The bonding process is completed by processing bubbles generated after bonding by a pressure rise.

Step S103, providing a backlight module 23, wherein the backlight module 23 is assembled with the liquid crystal cell 10, the backlight module 23 comprises a first through hole 230, and the first through hole 230 corresponds to the light transmissive area 10A.

In a process of assembling the backlight module 23 and the liquid crystal cell 10, the method includes steps of: tearing off the second protective film on the second polarizer 22, and bonding the backlight module 23 and the liquid crystal cell 10 with the glue 26.

Step S104, forming a second light shielding body 25 in the second opening 220, the second light shielding body 25 extending from the wall of the second opening 220 to a wall of the first through hole 230.

The material of the second light shielding body 25 is a second light shielding material, and the second light shielding body 25 is formed by coating the second light shielding material in the second opening 220. The second light shielding material may be a light shielding glue, and the light shielding glue may be applied to the second opening 220 by spot coating.

The second light shielding material may extend from the wall of the second opening 220 to the wall of the first through hole 230, and form the second light shielding body 25 by curing the second light shielding material. Because the second light shielding body 25 has a predetermined distance b near a boundary of the light transmissive area 10A, in a dispensing process, a size of the predetermined distance b can be adjusted according to a difference in apertures between the light transmissive area 10A and the first through hole 230. In addition, a light shielding range of the second light shielding body 25 on the second surface 10b can be controlled by adjusting a glue-out speed at time of dispensing and a size of a glue-out hole, thereby controlling a size of the predetermined distance b, such that an overflow glue generated when the second light shielding body 25 is formed is prevented from entering the light transmissive area 10A, thereby affecting lighting of the electronic device.

In addition, in a coating process, the second light shielding body 25 does not completely cover the wall of the first through hole 230 in consideration of operating conditions and a process cost. The specific coverage can be set according to the actual application. This is not limited.

In the manufacturing method of the display device 100 provided by an embodiment of the present application, the first light shielding material is coated or sprayed in the first opening 210 on a side of the color filter substrate 11 to form the first light shielding body 24. The second light shielding material is coated at the second opening 220 on a side of the array substrate 13 to form the second light shielding body 25. The first light shielding body 24 covers a light shielding area where the second light shielding body 25 is located, and this avoids issues of overflow of the second light shielding body 25 in a direction of the light transmissive area 10A, thereby ensuring a viewing angle range of an electronic device. In addition, when the backlight module 23 and the second polarizer 22 are bonded, the first light shielding body 24 covers the overflow portion of the second light shielding body 25 correspondingly, thereby ensuring integrity of an overall appearance of a light shielding glue.

The above provides a detailed introduction to the embodiments of the present application. The principles and implementations of the present application are described herein with specific examples. The above description of the embodiments is merely for facilitating an understanding of the present application. In addition, those skilled in the art will have any changes in the specific embodiments and application scopes according to the idea of the present application. In summary, the content of this specification should not be construed as limiting the application.

What is claimed is:
1. A display device, comprising:
a liquid crystal cell comprising a light transmissive area for passing light required for an electronic device, wherein the liquid crystal cell comprises a first surface and a second surface, the first surface is oriented a side of a user, and the second surface is located on a side facing a backlight module;

a first polarizer disposed on the first surface; wherein the first polarizer is provided with a first opening, and an orthographic projection of the light transmissive area on the first surface is located within an orthographic projection of a wall of the first opening on the first surface;

a second polarizer disposed on the second surface; wherein the second polarizer is provided with a second opening, and an orthographic projection of the light transmissive area on the second surface is located within an orthographic projection of a wall of the second opening on the second surface;

the backlight module disposed on a side of the second polarizer; wherein the backlight module is bonded to the liquid crystal cell through a glue, the backlight module comprises a first through hole, and the first through hole corresponds to the light transmissive area;

a first light shielding body disposed in the first opening, wherein an orthographic projection of the first light shielding body on the first surface is located at an outer circumference of an orthographic projection of the light transmissive area on the first surface, and the first light shielding body is a light shielding glue or a black ink; and a second light shielding body disposed in the second opening and extending to a wall of the first through hole, wherein an orthographic projection of the second light shielding body on the second surface is located at an outer circumference of an orthographic projection of the light transmissive area on the second surface, and the second light shielding body is a light shielding glue.

2. The display device according to claim 1, wherein the liquid crystal cell further comprises a color filter substrate and an array substrate disposed opposite to each other and a liquid crystal disposed between the filter film substrate and the array substrate;

the color filter substrate comprises a first substrate and a color filter functional layer disposed on the first substrate, the color filter functional layer is provided with a second through hole corresponding to the light transmissive area, and the second through hole exposes the first substrate;

the array substrate comprises a second substrate and a thin film transistor functional layer disposed on the second substrate, the thin film transistor functional layer is provided with a third through hole corresponding to the light transmissive area, and the third through hole exposes the second substrate;

the liquid crystal is filled in the second through hole and the third through hole; and the light transmissive area comprises an exposed portion of the first substrate, an exposed portion of the second substrate, and the liquid crystal between the exposed portion of the first substrate and the exposed portion of the second substrate.

3. The display device according to claim 2, wherein the first light shielding body is attached to the wall of the first opening, and the second light shielding body is attached to the wall of the second opening;

an orthographic projection of the second light shielding body on the second surface is located within an orthographic projection of the first light shielding body on the second surface.

4. The display device according to claim 3, wherein the second light shielding body has a predetermined distance from a boundary of the light transmissive area.

5. The display device according to claim 1, wherein an orthographic projection of the wall of the second opening on the first surface is located within an orthographic projection of the wall of the first opening on the first surface.

6. The display device according to claim 1, wherein the first through hole is disposed coaxially with the light transmissive area.

7. A display device, comprising:
a liquid crystal cell comprising a light transmissive area for passing light required for an electronic device, wherein the liquid crystal cell comprises a first surface and a second surface, the first surface is oriented a side of a user, and the second surface is located on a side facing a backlight module;

a first polarizer disposed on the first surface; wherein the first polarizer is provided with a first opening, and an orthographic projection of the light transmissive area on the first surface is located within an orthographic projection of a wall of the first opening on the first surface;

a second polarizer disposed on the second surface; wherein the second polarizer is provided with a second opening, and an orthographic projection of the light transmissive area on the second surface is located within an orthographic projection of a wall of the second opening on the second surface;

the backlight module disposed on a side of the second polarizer; wherein the backlight module comprises a first through hole, and the first through hole corresponds to the light transmissive area;

a first light shielding body disposed in the first opening, wherein an orthographic projection of the first light shielding body on the first surface is located at an outer circumference of an orthographic projection of the light transmissive area on the first surface; and a second light shielding body disposed in the second opening and extending to a wall of the first through hole, wherein an orthographic projection of the second light shielding body on the second surface is located at an outer circumference of an orthographic projection of the light transmissive area on the second surface.

8. The display device according to claim 7, wherein the liquid crystal cell further comprises a color filter substrate and an array substrate disposed opposite to each other and liquid crystal disposed between the filter film substrate and the array substrate;

the color filter substrate comprises a first substrate and a color filter functional layer disposed on the first substrate, the color filter functional layer is provided with a second through hole corresponding to the light transmissive area, and the second through hole exposes the first substrate;

the array substrate comprises a second substrate and a thin film transistor functional layer disposed on the second substrate, the thin film transistor functional layer is provided with a third through hole corresponding to the light transmissive area, and the third through hole exposes the second substrate;

the liquid crystal is filled in the second through hole and the third through hole; and the light transmissive area comprises an exposed portion of the first substrate, an exposed portion of the second substrate, and liquid crystal between the exposed portion of the first substrate and the exposed portion of the second substrate.

9. The display device according to claim 8, wherein the first light shielding body is attached to the wall of the first opening, and the second light shielding body is attached to the wall of the second opening;

an orthographic projection of the second light shielding body on the second surface is located within an orthographic projection of the first light shielding body on the second surface.

10. The display device according to claim 9, wherein the second light shielding body has a predetermined distance from a boundary of the light transmissive area.

11. The display device according to claim 7, wherein the backlight module is bonded to the liquid crystal cell through a glue.

12. The display device according to claim 11, wherein an orthographic projection of the wall of the second opening on the first surface is located within an orthographic projection of the wall of the first opening on the first surface.

13. The display device according to claim 7, the first light shielding body is a light shielding glue or a black ink; and the second light shielding body is a light shielding glue.

14. The display device according to claim 7, wherein the first through hole is disposed coaxially with the light transmissive area.

15. A manufacturing method of a display device, comprising:

providing a liquid crystal cell comprising a light transmissive area, a first surface, and a second surface, wherein a first polarizer disposed on the first surface, a second polarizer disposed on the second surface, the first polarizer is provided with a first opening, the second polarizer is provided with a second opening, an orthographic projection of the light transmissive area on the first surface is located within an orthographic projection of a wall of the first opening on the first surface, and an orthographic projection of the light transmissive area on the second surface is located within an orthographic projection of a wall of the second opening on the second surface;

forming a first light shielding body in the first opening, the first light shielding body extending from the wall of the first opening to a boundary of the light transmissive area;

providing a backlight module, wherein the backlight module is assembled with the liquid crystal cell, the backlight module comprises a first through hole, and the first through hole corresponds to the light transmissive area; and forming a second light shielding body in the second opening, the second light shielding body extending from the wall of the second opening to a wall of the first through hole.

16. The manufacturing method according to claim 15, wherein forming the first light shielding body in the first opening comprises:

coating or spraying a first light shielding material in the first opening, the first light shielding material extending from the wall of the first opening to the boundary of the light transmissive area; and curing the first light shielding material to form the first light shielding body.

* * * * *